United States Patent Office 3,573,237
Patented Mar. 30, 1971

3,573,237
DECORATIVE FINISH-PRODUCING COMPOSITION AND METHOD OF APPLYING SAME
John C. Zola, 2662 10th Ave., Arcadia, Calif. 91006
No Drawing. Continuation-in-part of application Ser. No. 615,044, Feb. 8, 1967, which is a continuation-in-part of application Ser. No. 201,274, June 11, 1962. This application Jan. 8, 1968, Ser. No. 696,253
Int. Cl. C08b 21/08, 21/12
U.S. Cl. 260—16
33 Claims

ABSTRACT OF THE DISCLOSURE

A coating composition for selectively imparting a pattern of a desired design to a surface, with the pattern at least in part being determined by the mode of application of the composition to the surface. The composition includes two or more phases that are immiscible. The phases comprise miscible organic solvents that are rendered immiscible by dissolving incompatible organic film formers therein. By agitation, the composition assumes the form of a transient dispersion in which the first fluid component is in the form of tiny globules that may be invisible to the naked eye, but are characterized by the tendency thereof to coalesce at least in part into agglomerates of 25 microns or greater after the composition has been applied to a surface. The clusters are individually visible to the naked eye. The pattern the clusters assume and the decorative effect achieved is determined at least in part by the mode of application of the composition to the surface.

CROSS-REFERENCES TO RELATED APPLICATIONS

The present application is a continuation-in-part application of my pending application Ser. No. 615,044 entitled Novel Coating Compositions and Their Preparation filed Feb. 8, 1967, which is a continuation-in-part of application Ser. No. 201,274 filed June 11, 1962 (now abandoned).

BACKGROUND OF THE INVENTION

Field of the invention

The present invention relates generally to the field of of coating compositions, and more particularly to a decorative finish-producing material that includes at least two immiscible liquid phases containing incompatible organic film formers dissolved in miscible organic solvents which are volatile. At least one phase of said composition is colored, or of an appearance different from that of the other phase, with said material selectively providing a variety of decorative patterns to a surface, depending upon the mode of application of the composition thereto.

Description of the prior art

In the past, various types of dispersions have been used to provide decorative coatings on predetermined surfaces, of which plastisols and organosols are common examples. Plastisols and organosols are unsatisfactory in providing multicolor compositions, for to obtain sound coherent coatings the dispersed particles must be extremely small, and to such an extent that they are not visually distinct one from the other. Furthermore, elevated temperatures are required to fuse the particles together after application.

Yet another objection to use of organosols or plastisols in providing a multicolor coating is that the application thereof requires a sequence of operations or special equipment to simultaneously apply contrasting colored portions thereof.

Various types of specialty coatings have also been used in the past, but in the main, these coatings have suffered from the same operational disadvantages as encountered with plastisols and organosols.

Heretofore multicolor coating compositions have been prepared by providing dispersions of relatively large particles of a coating vehicle in a liquid medium. Such dispersions have generally required the employment of an immiscible pair of solvents in the dispersed and dispersing media, such as disclosed in my United States Letters Pat. No. 2,591,904.

Another means of attaining dispersions through immiscible solvents is that disclosed in the United States Letters Pat. No. 2,990,386 granted to Roney who employs non-aqueous solvents in both dispersed and dispersing media. Coating formulations applied in accordance with the Roney concept are obviously limited to the use of coating materials which have satisfactory selective solubility in one member of a group of immiscible solvent pairs. Since in the non-aqueous field such immiscible pairs are relatively rare, at least one of them is likely to be undesirable from the standpoint of cost, volatility, toxicity, and the like. Also, it has been found that dispersions based on immiscible non-aqueous solvents frequently have only marginal stability.

Multi-color coating compositions have also been provided by dispersions wherein the solvents employed in different phases are miscible with one another. In United States Letters Pat. No. 2,964,417, Ward teaches that it is possible to attain insolubilizations of the dispersed particles in the dispersing medium by use of a solvent mixture in the dispersing medium which precipitates, or throws out of solution, the solid of the coating material employed in the dispersed phase. In this precipitation of the coating material when the dispersed phase is mixed with the dispersing medium, the precipitated coating material takes the form of fibrous or flake-like particles which have little tendency to coalesce, either in the liquid coating composition or in the film deposited therefrom. Instead, the precipitated dispersed particles are bound together in the finished film by coating materials deposited from the dispersing medium.

The procedure found in said Ward patent for attaining dispersions useful as coating compositions would appear to be inferior to that of the Roney concept. The Ward coating contains precipitated particles which do not readily knit with one another, or fuse smoothly with the coating materials of the dispersing medium. The precipitated particles tend to be porous in nature, and fibre-like to flake-like in shape, often protruding roughly from the surface of the coating film, which definitely does not contribute to effect a sound coating. The general appearance of the Ward coating is similar to that which could be attained more economically by dispersing solid fibrous material in a single phase coating vehicle.

The present invention overcomes the operational disadvantages of previously available multicolor compositions, for it provides a transient color-stable dispersion defined by at least first and second immiscible phases containing first and second incompatible organic film formers dissolved in organic solvents that are substantially miscible, with the dispersion being capable of forming a decorative finish on a desired surface at room temperature of any one of a plurality of patterns unattainable by any one of the prior art coating compositions.

SUMMARY OF THE INVENTION

A non-aqueous transient dispersion having at least first and second phases, each one of which is colored or different in appearance than any other phase or phases thereof. The dispersion contains at least first and second miscible organic solvents in which first and second organic film formers are dissolved, which film formers when dry are hard and durable, with the dispersion being adapted to be applied to a surface to transform at room temperature into a continuous decorative finish of any one of a variety of patterns, depending upon the mode of application to said surface. The finish is heterogeneous but continuous in structure, and defined by spaced discrete areas of said first and second film formers which are bonded to one another.

It is an object of the present invention to provide coating compositions which utilize a new and distinct concept and overcome the limitations of prior art coating materials.

It is another object of the present invention to employ non-aqueous media for the production of multicolored coating compositions, which by simple air-drying at ambient temperatures, are capable of forming sound, coherent coatings, either smooth or textured, and of variable thickness and covering ability.

It is a further object of the present invention to provide coating compositions comprising non-aqueous dispersions in which the dispersed phase is immiscible with the dispersing medium, with the solvents of each phase being miscible, and the film-forming materials in each phase being essentially in solution and not precipitated or flocculated by the presence of the other phase.

Still a further object of the invention is to supply a multiphase decorative finish-producing composition that may be applied as a continuous heterogeneous film and bonded to a predetermined surface, which film is characterized by a plurality of spaced discrete areas of incompatible polymers which vary in appearance and shape, with said areas being bonded to one another, and with the pattern defined by the areas being dependent upon the particular method used in applying the composition to said surface.

Yet another object of the invention is to supply a decorative finish-producing composition, which after application to a desired surface, sets at room temperature, which same composition is adapted for use to obtain diverse decorative effects.

A still further object of the invention is to furnish a coating composition that may be used to upgrade inexpensive wood of strong grain structure such as Douglas fir by masking the original grain thereof and providing a decorative finish of finer grain structure which is suggestive of harder, more expensive woods.

Yet still a further object of the invention is to provide a coating composition, which after application thereof to a selected substrate by spray or roller means, may be subjected to mechanical treatment while still wet, as for example, combing, sponging, graining roller, and the like, with the pattern of the applied film changing in accordance with the mechanical means used in distributing the same.

DESCRIPTION OF THE PREFERRED EMBODIMENT

The transient dispersion coating compositions of the present invention results from the use of incompatible polymers that are dissolved in miscible organic solvents to provide a decorative finish in any one of a desired number of patterns on a substrate.

In the coatings field, the term "incompatible" is commonly understood to refer to the development of hazy or opaque films upon evaporation of solvent from a polymer solution. Hazy or opaque films stem from the fact that although the solution is initially homogeneous, phase separation occurs at some point before volatilization is complete. During the drying process the concentration of some components have become sufficiently great to develop immiscible solutions. In the past, the use of incompatible polymers has generally been avoided because the separating particles are extremely small whereby the resulting film is likely to be somewhat hazy, opaque or low in gloss. In many cases, the film may also show reduced physical integrity.

It has been determined that incompatible polymers can be used to produce wholly satisfactory decorative films, provided the areas of heterogeneity are macroscopic rather than microscopic. In the present invention the decorative finish-producing material comprises a transient multiple phase dispersion in which each phase is colored or of an appearance different from the balance of the phases thereof.

To provide the required decorative finish, at least some of the discrete, spaced areas deposited from said dispersion must be substantially larger than colloidal dimensions. The minimum area of normal visibility is not easily defined, since it is dependent on a number of factors including illumination, color contrast, geometrical configuration of the elements, etc. For example, the minimum angle of visibility for a linear element is commonly smaller than that for a dot having the same minimum dimension. Also, in the present compositions, distinctly visible pattern elements often result from the partial clustering of basic color areas which in a more uniform arrangement do not contrast sharply with their surroundings. For the majority of preferred patterns, however, a substantial number of the basic spaced, discrete areas should have dimensions of at least 25–50 microns, or greater.

One means of preparing the finish-producing material is to intermix the film forming vehicles which comprise its several phases, by stirring them together to form a dispersion before application to a surface. Upon application of this dispersion, some of the spaced, discrete areas in the decorative finish may have dimensions similar to those of the original dispersed bodies. Often, however, the discrete areas of the decorative coating will differ from said bodies in either size or shape, or both. In some cases the areas of discontinuous color in the coating will correspond to the continuous phase of the dispersion.

Because of the flowable nature of both phases of the present compositions, the original elements are often distorted by the process of application, and the applied elements are often modified or rearranged before the film sets by forces of surface tension, convection, gravity, or the like. In the decorative finish, areas of contrasting appearance are generally formed in part by the coalescence of dispersed droplets during volatilization of the solvent. Because of these factors, the resulting pattern is largely dependent on the method of application, and to some degree on the texture and absorptive quality of the substrate.

Phase separation in the present compositions is attained and maintained by providing two or more coating vehicles which display a certain minimum differential in their solubility characteristics. The nature or degree of this differential is affected by both the solvents and resins which are chosen for the several phases, and is generally provided in part by both solvents and resins. In this way, immiscibility of solutions can be attained without the necessity of using immiscible solvents.

Phase separation of solvents and resins is commonly discussed in terms of the solubility parameters of the components. Considering first the solvents alone, the difference in solubility parameter of the solvents is conveniently called the solvent differential, and phase separation occurs when the solvent differential exceeds a certain value which is roughly the same for many solvent combinations. In the practise of conventional coatings technology, the degree of solvent differential required for immiscibility is often not readily or economically attainable, and is not required by the compositions of the present invention. However, a solvent differential which is insufficient in itself to yield phase separation can aid substantially in providing the required minimum differential in solubility characteristics of film forming solutions. The preferred solvents need not have identical solubility parameters, but must be at least partially miscible with one another, and neither must act as a precipitant for the polymer of the other phase. Since different polymers have different solvent requirements, a solvent differential is often desirable, and can reduce the difference in solubility characteristics required for the film formers.

In the present compositions, phase separation is provided primarily by the film forming materials in each phase. It is characteristic of the materials commonly used as film formers that phase separation occurs at much lower differentials in solubility parameter than that required for immiscible solvents. By use of polymers with moderately different solubility parameters, two-phase compositions are readily attainable with many pairs of film formers, even when a common solvent is used for both phases. In illustration of the scope of film formers which can be used in practising the present invention, the following table lists some of the pairs of coating vehicles which are immiscible.

ficiently high that polymer ratios and other factors such as temperature are of relatively minor significance.

For the purpose it is convenient to refer to the degree of incompatibility of two polymers or mixtures of polymers by the notation "DI." In the present compositions the DI is related particularly to the minimum concentrations required for phase separation. A pair of polymers with a high DI will separate at a lower minimum concentration than that required for a lower DI. A satisfactory DI must bring about phase separation within a preferred range of minimum concentrations.

As in conventional use, for the compositions of the present invention, it is preferable to employ film forming vehicles which contain at least 10–20% solids. A DI which yields phase separation at much lower concentrations is therefore unnecessary. However, the DI must be sufficiently high to bring about phase separation at concentrations that provide desirable viscosities.

For the continuous phase in particular, and often for the dispersed phase, the preferred viscosities are rela-

EXAMPLES OF IMMISCIBLE SYSTEMS OR PAIRS OF RESINS AND SOLVENTS

| | First phase | Second phase |
|---|---|---|
| 1 | Raw linseed oil (without volatile solvent) | Melamine-formaldehyde resin in xylol-butanol. |
| 2 | Raw linseed oil in toluene | Styrenated alkyd in toluene. |
| 3 | Oxidized linseed oil in toluene | Do. |
| 4 | Oxidized linseed oil in odorless mineral spirits | Dehydrated castor oil in odorless mineral spirits. |
| 5 | do | Cyclopentadiene modified linseed oil in odorless mineral spirits. |
| 6 | Vacuum polymerized linseed oil in toluene | Styrenated alkyd in toluene. |
| 7 | Vacuum polymerized linseed oil in odorless mineral spirits. | Limed linseed-soya alkyd in mineral spirits and odorless mineral spirits. |
| 8 | do | Styrenated soybean oil in mineral spirits. |
| 9 | Dehydrated castor oil in toluene | Melamine formaldehyde resin in xylol-butanol. |
| 10 | Polyurethane (prereacted type) in xylol | Chlorinated natural rubber in toluene. |
| 11 | Cellulose acetate butyrate (29.5% acetyl, 17% butyryl) in 1-nitropropane. | Vinyl chloride-vinyl acetate copolymer (vinyl chloride, 87%; vinyl acetate, 13%) in 1-nitropropane. |
| 12 | Nitrocellulose (11.8–12.2% nitrogen) in butyl acetate. | Low viscosity styrene butadiene resin in butyl acetate. |
| 13 | Acrylic ester resin in toluene | Low viscosity stryene butadiene resin in toluene. |
| 14 | Acrylic ester resin in solvent mixture of ethylene glycol monoethyl ether acetate and toluene (2 parts to 3 by weight). | Linear polyester resin in solvent mixture of ethylene glycol monoethyl ether acetate and toluene (2 parts to 3 by weight). |
| 15 | Chlorinated natural rubber in xylene | Silicone resin in xylene. |
| 15(a) | do | Styrene-butadiene copolymer in xylene. |
| 16 | Chlorinated natural rubber in methyl isobutyl ketone. | Melamine-formaldehyde resin in xylol-butanol. |
| 17 | Styrene-butadiene copolymer in xylene | Chlorosulfonated polyethylene in xylene. |
| 17(a) | do | Polyurethane (pre-reacted type) in xylene. |
| 17(b) | do | Oxidized linseed oil in xylene. |
| 18 | Styrene-butadiene copolymer in methyl isobutyl ketone. | Melamine-formaldehyde resin in xylol-butanol. |
| 19 | Silicone resin in xylene | Vinyl chloride-vinylidene chloride copolymer in xylene. |
| 19(a) | do | Chlorosulfonated polyethylene in xylene. |
| 19(b) | do | Polyurethane (pre-reacted type) in xylene. |
| 19(c) | do | Oxidized linseed oil in xylene. |
| 20 | Isobutyl methacrylate polymer in xylene | Stryene-butadiene copolymer in xylene. |
| 20(a) | do | Styrenated alkyd in xylene. |
| 22(b) | do | Chlorosulfonated polyethylene in xylene. |
| 20(c) | do | Oxidized linseed oil in xylene. |
| 21 | Cellulose acetate butyrate (13% acetyl; 37% butyryl) in xylene-methyl isobutyl ketone. | Vinyl chloride-vinyl acetate copolymer (87% vinyl chloride; 13% vinyl acetate) in xylene-methyl isobutyl ketone. |
| 21(a) | do | Chlorosulfonated polyethylene in xylene-methyl isobutyl ketone. |
| 21(b) | do | Styrene - butadiene copolymer in xylene-methylisobutyl ketone. |
| 21(c) | do | Silicone resin in xylene-methyl isobutyl ketone. |
| 22 | Polyester resin (high molecular weight linear type) in dioxane. | Vinylidene chloride-acrylonitrile copolymer in dioxane. |
| 22(a) | do | Polyvinyl butyral (9–13% hydroxyl; 0–2.5% acetate; 88% butyral) in dioxane. |
| 22(b) | do | Vinyl chloride-vinyl acetate copolymer (87% vinyl chloride; 13% vinyl acetate) in xylene-methyl isobutyl ketone. |
| 22(c) | do | Cellulose acetate butyrate 13% acetyl; 37% butyrl) in xylene-methyl isobutyl ketone. |
| 22(d) | do | Isobutyl methacrylate polymer in xylene. |
| 22(e) | do | Styrene-butadiene copolymer in xylene. |
| 22(f) | do | Melamine-formaldehyde resin in xylol-butanol. |

In any plurality of incompatible polymers in a common solvent, phase separation is dependent in part on factors other than the difference in their solubility parameters. These include the concentration and molecular weight of the polymers, and possibly the shape of the molecules. In practising the present invention, the concentration and molecular weight of polymers is suftively low. The desired viscosities are determined by the required flowability of one or both phases in order to provide the preferred patterns. In particular, the viscosity of at least one of the phases must be sufficiently low to permit application in the desired manner, and to permit whatever coalescence of droplets or change in configuration is required for pattern formation.

The DI of the film formers is not only significant in providing immiscibility at the required viscosities, but to a degree affects the rate of particle coalescence. If a pair of film formers provides adequate phase separation but inadequate coalescence of droplets at the desired viscosities, the need for components providing a greater DI is indicated.

With respect to immiscibility of phases and rate of coalescence of dispersed droplets, the effective or apparent DI of immiscible solutions is determined in part by the solvent strength of the solvents for the polymers, as well as by the DI of the dissolved film formers. (The concept of solvent strength is well understood in the field of coatings technology, and is not directly related to the concept of solvent differential discussed hereinabove.) In general, the apparent DI increases as the solvent strength of either phase is reduced. The DI required for two film formers is thus reduced to a minimum by using the weakest solvents which satisfactorily prevent precipitation and provide the desired viscosities and solids content.

The present invention makes possible the use of film formers having a wide range of DI. It is preferable, however, that they should not be extremely incompatible, for film formation may then be impaired. In some cases, as in Example V below, it may be desirable to use combinations of resins in one or more of the phases in order to attain a suitable DI.

In practice, the behavior indicating the required DI or its absence, is readily observed and interpreted by those skilled in the art of coatings technology. Excessive incompatibility is indicated by lack of sound cohesion between the different sections of the heterogeneous film. If the two phases have been colored, inadequate dispersed globule or droplet size is, of course, evident from the lack of visible color distinction in the liquid coating composition, as well as in the applied film. Often it is more convenient to judge the rate of phase separation by observing a mixture of the two clear coating vehicles as a wet film under a low power microscope. Adequate phase separation is indicated by the appearance of a substantial number of dispersed bodies about 25–50 microns in size or larger, a short time after stirring the mixture and allowing it to set.

The required DI is readily obtained when the film formers of both phases are high polymers such as vinyls, acrylics, styrene-butadiene and the like, and also if the film former of one or both phases is one of lower molecular weight, such as an alkyd or modified drying oil. While resins of lower molecular weight have a lower tendency toward phase separation, this can be compensated satisfactorily by using higher concentrations or greater difference in solubility parameter. As indicated in the table set forth herein, it is even possible to use in one of the phases a liquid film former which requires no solvent to provide the desired viscosity. Although this fluid film former is miscible with the solvent of the other phase, it will be immiscible with the polymer solution with which it is paired. When one of the film formers is fluid or very low in molecular weight, other factors such as temperature and phase ratios become more significant in insuring adequate phase separation.

One of the most novel and unexpected aspects of this embodiment of the present invention is that each phase can be colored differently by dispersing pigments in each coating composition prior to mixing thereof, and the varicolored phases can then be mixed to form a multicolor coating. When difficulty is encountered with transfer of pigment from one phase to another, this appears to be related to an insufficient DI of the polymers, or to inadequate wetting of the pigments by their own vehicles before intermixing with the other vehicle.

In the present invention, a first phase may contain a mixture of polymers, with the second phase containing a single polymer. The polymers in the first phase must be substantially compatible, yet in combination, incompatible with the polymer in the second phase. For example, if resins A and B are substantially compatible, but incompatible with C, and if in dispersions of A and C the DI is too high, and in dispersions of B and C the DI is too low, a mixture of A and B can be used advantageously to disperse with C. If with two polymers, P and Q, considerable proportions of Q are compatible with P, the DI may also be reduced by mixing a portion of Q with the solution of P, then dispersing the P-Q solution with solution Q.

The essential factors of transient dispersions have been set forth herein in terms of two immiscible phases. Although this is the typical situation, the same principles apply to the use of three or more immiscible coating compositions to provide a three or more coating composition as illustrated in Example VI. In the transient dispersions, both dispersed and dispersing phases are generally colored, though one of them can be used as a clear film-former. The dispersed droplets tend to coalesce during setting of the film, and many of the final droplets are derived from the coalesce of smaller particles. Visible pattern elements may be formed in the present invention by aggregation of nearly invisible droplets into noncoalescing clusters that are visible.

Because of this method of pattern formation, most transient dispersions tend to provide decorative effects different from those attainable by the use of stable dispersions. Patterns resulting from spray application of a transient dispersion often display intricate interwoven effects, some of which simulate the appearance of leather or hammer-type finishes. Patterns derived by brushing, doctoring, or other shear type of application are even more unique, since they yield striated effects which can resemble wood grains or marbleized finishes. These striated patterns result from the fluid character of the compositions of the present invention, which allow both phases to flow without mixing of the colors thereof.

It is a characteristic of the transient dispersions that while the dispersed droplets normally remain suspended for considerable periods of time, coalescence will eventually occur to result in separate layers, if there is a substantial difference in the specific gravities of the two phases. The original state of the composition is readily restored, however, by light stirring. Occasional stirring of the composition during application thereof may also be desirable in order to insure uniform results.

Another interesting characteristic of the transient dispersions is that either phase is susceptible of being tinted independently after formation of a dispersion by adding a further quantity of one of the phases that is tinted to a color different than that of the phase initially present in the dispersion. This affords obvious advantages in the process of manufacturing, and also in usage by applicators in the field.

While the most striking aspects of the present heterogeneous dispersions are related to multi-color film formation, they are also novel in that films of attractive appearance and good physical properties are provided thereby, which are not normally associated with incompatible film-formers. These desirable and unexpected features apparently arise from the employment of dispersions of macroscopic particle size in which the discontinuous elements are not emulsified, but are largely within the range of visual distinction.

To more clearly disclose the nature thereof, the following examples illustrating the invention are provided. It should be understood, however, that this done solely by way of example and is intended neither to delineate the scope of the invention nor limit the ambit of the appended claims. Unless otherwise stated, all parts of the ingredients are expressed in terms of parts by weight.

The following Examples I through IX illustrate the transient dispersions, in which the dispersed droplets coalesce and phase separation is dependent primarily on the degree of incompatibility of the polymers used in the separate phases.

EXAMPLE I

Multi-color nitrocellulose-vinyl resin coating composition

Composition A—Yellow nitrocellulose vehicle

| | Parts by weight |
|---|---|
| Nitrocellulose (11.8–12.2% nitrogen, 5–6.5 sec. viscosity, 30% butyl alcohol) | 5.2 |
| Dibutyl phthalate | 3.5 |
| Butyl acetate | 45.2 |
| Toluene | 45.2 |
| Yellow iron oxide | 0.9 |
| Total | 100.0 |

Composition B—Red vinyl resin vehicle:

| | Parts by weight |
|---|---|
| Vinyl chloride-vinyl acetate copolymer, partially saponified (vinyl chloride, 91%; vinyl acetate, 3%; vinyl alcohol, 6%) Bakelite VAGH | 16.5 |
| Dibutyl phthalate | 4.9 |
| Butyl acetate | 38.5 |
| Toluene | 38.5 |
| Red iron oxide | 1.6 |
| Total | 100.0 |

Composition C—Multicolor yellow-red nitrocellulose-vinyl resin coating.—38 parts of composition B were added to 62 parts of composition A, and the resulting mixture was stirred with moderate agitation until a dispersion (composition C) of uniform appearance was obtained. Composition C was sprayed as a heavy wet coat onto a tinned steel panel with an ordinary lacquer gun. On setting, the film showed a clearly visible red and yellow multicolor pattern.

EXAMPLE II

Multicolor epoxy-polyurethane coating composition

Composition A—Red epoxy resin vehicle:

| | Parts by weight |
|---|---|
| Epichlorohydrin-bisphenol A resin (molecular weight, 900–1000) | 37.5 |
| Toluene | 28.1 |
| Ethylene glycol monoethyl ether acetate | 28.1 |
| Red iron oxide | 6.3 |
| Total | 100.0 |

Composition B—Yellow polyurethane vehicle:

| | Parts by weight |
|---|---|
| Polyurethane resin solution (one package, stable, oxygen-curing type without free isocyanate, 50% solids in xylol) (Spencer Kellogg XP–1197) | 80 |
| Ethylene glycol monoethyl ether acetate | 10 |
| Tinting paste, medium chrome yellow in linseed oil, 70% pigment | 10 |
| Total | 100.0 |

Composition C—Multicolor red-yellow epoxy-polyurethane coating.—50 parts of composition A were added to 50 parts of composition B, and the resulting mixture was stirred with moderate agitation until a dispersion (composition C) of uniform appearance was obtained. Composition C was brushed onto a tinned steel panel with an ordinary paint brush. This gave a smooth film in which a multicolored pattern of striations was readily apparent to the naked eye. Microscopic examination showed that this pattern was formed by the orientation of dispersed droplets or globules, which during the setting of the film had aggregated into relatively large clusters without complete coalescence. These clusters were of such size as to be easily distinguished by the naked eye, though many of the individual particles could not be.

This example illustrates the attainability of a glossy multicolor film, and the formation of a distinctly visible pattern through the orientation and clustering of droplets too small in themselves to be readily visible to the naked eye.

EXAMPLE III

Multicolor alkyd resin-styrene butadiene coating composition

Composition A—Yellow alkyd resin vehicle:

| | Parts by weight |
|---|---|
| Yellow iron oxide | 8.50 |
| Barium potassium chromate | 4.27 |
| Soya-chinawood alkyl (52% oil, 35% phthalic anhydride, 50% solids in mineral spirits) Reichhold's Beckosol P–531 | 35.60 |
| Phenolated alkyd (28% linseed oil, 27% phthalic anhydride, 60% solids in high solvency naphtha, kauri butanol value, 68) Reichhold's Beckosol 1341 | 30.56 |
| Aromatic petroleum solvent (kauri butanol value, 94; distillation range 278–332° F.) | 17.00 |
| Dipentene | 2.42 |
| Anti-skinning agent | 0.24 |
| Cobalt naphthenate drier in mineral solvent, cobalt, 6% | 0.37 |
| Lead naphthenate dried in mineral solvent, lead, 24% | 0.74 |
| Manganese naphthenate drier in mineral solvent, manganese, 6% | 0.12 |
| Calcium naphthenate drier in mineral solvent, calcium, 4% | 0.18 |
| Total | 100.0 |

Composition B—Green styrene butadiene vehicle:

| | Parts by weight |
|---|---|
| Chrome green oxide | 10.2 |
| Aluminum silicate | 10.4 |
| Dimethyl dioctadecyl ammonium bentonite | 0.20 |
| Styrene butadiene resin (low viscosity type) solution viscosity, 33⅓% resin in xylene, requires 195 to 240 seconds to drain #4 Ford Cup at 77° F.) Pliolite S–5A | 11.70 |
| Styrene 2 butadiene resin (high viscosity type) (85% styrene and 15% butadiene, softening point 49° C.) Pliolite S–6B | 1.70 |
| Chlorinated poly-phenyl resin (Aroclor 5460) | 5.00 |
| Chlorinated biphenyl (Aroclor 1254) | 0.75 |
| Tricresyl phosphate | 1.30 |
| Chinawood oil | 1.00 |
| Mineral spirits | 8.60 |
| Aromatic petroleum solvent (kauri butanol value, 72; distillation range 321–398° F.) | 48.74 |
| Dipentene | 0.30 |
| Acetone | 0.06 |
| Drier, cobalt naphthenate in mineral solvent (6% cobalt content) | 0.02 |
| Drier, manganese naphthenate in mineral solvent (6% manganese content) | 0.03 |
| Total | 100.0 |

Composition C—Multicolor yellow-green alkyd-styrene butadiene coating.—Equal parts of compositions A and B were intermixed, and stirred until a dispersion of uniform appearance was obtained. Soon after agitation was interrupted, resulting composition C was sprayed and brushed onto tinned steel panels, using an ordinary lacquer gun or paint brush. Brushing gave a striated, multicolored film in which the individual areas of yellow and green were clearly visible to the unaided eye. Spraying gave a less directional pattern.

EXAMPLE IV

Multicolor alkyd-ethyl cellulose coating composition

Composition A—Yellow alkyd vehicle:

| | Parts by weight |
|---|---|
| Rosin modified alkyd (34% soya oil, 44% phthalic anhydride, 50% solids in xylol) Reichhold's Beckosol 1303-50 | 50.9 |
| Yellow iron oxide | 2.5 |
| Xylol | 45.7 |
| Cobalt naphthenate drier in mineral solvent, cobalt, 6% | 0.26 |
| Manganese naphthenate drier in mineral solvent, manganese, 6% | 0.26 |
| Lead naphthenate drier in mineral solvent, lead, 24% | 0.38 |
| Total | 100.0 |

Composition B—Red ethyl cellulose vehicle:

| | Parts by weight |
|---|---|
| Ethyl cellulose (49.0+% ethoxyl content, 100 cps. viscosity) | 10 |
| Red iron oxide | 1.2 |
| Aromtaic petroleum solvent (kauri butanol value, 72; distillation range 321–398° F.) | 88.8 |
| Total | 100.0 |

Composition C—Multicolor yellow-red alkyd-ethyl cellulose coating.—67 parts of composition A were intermixed with 33 parts of composition B, and stirred with moderate agitation until a dispersion of uniform appearance was obtained. Shortly after interruption of agitation, the resulting composition C was sprayed and brushed onto tinned steel panels, using an ordinary lacquer gun or paint brush. In either case, a visible multicolor effect appeared upon setting of the film. Brushing produced striations, while spraying gave a non-directional pattern.

EXAMPLE V

Multicolor vinyl, alkyd modified acrylic-polyester coating composition

Composition A—Red vinyl, alkyd modified acrylic vehicle:

| | Parts by weight |
|---|---|
| Vinyl chloride-vinyl acetate copolymer, partially saponified (vinyl chloride, 91%; vinyl acetate, 3%; vinyl alcohol, 6%). (The degree of saponification is indicated by the proportion of vinyl acetate (3%) to vinyl alcohol (6%), the latter being obtained by the saponification of the former) (intrinsic viscosity in cyclohexanone at 20° C. is approximately 0.55) Bakelite VAGH | 10.8 |
| Alkyd modified acrylic resin, semioxidizing oil, 50% solids in xylol (Lustrasol 4280, Reichhold) | 36.1 |
| Red iron oxide | 2.4 |
| Isopropyl alcohol | 14.4 |
| Acetone | 36.1 |
| Cobalt naphthenate drier in mineral solvent; cobalt, 6% | 0.2 |
| Total | 100.0 |

Composition B—Yellow polyester vehicle:

| | Parts by weight |
|---|---|
| Linear polyester resin, softening range, 67–72° C. (Vitel PE–200) | 24.4 |
| Yellow iron oxide | 2.4 |
| Toluene | 48.8 |
| Methyl isobutyl ketone | 24.4 |
| Total | 100.0 |

Composition C—Multi-color red-yellow vinyl, alkyd modified acrylic-polyester coating.—Equal parts of compositions A and B were intermixed, and stirred until a dispersion of uniform appearance was obtained. Soon after agitation was interrupted, resulting composition C was brushed onto a tinned steel panel with an ordinary paint brush, yielding a continuous film with clearly visible multicolor grain effect resembling that of wood.

Heating the panel to 250° F. for several minutes considerably increased the film gloss.

In this example a mixture of resins was used in one phase in order to provide the desired degree of incompatibility with the resin of the other phase, thus permitting both adequate phase separation and good film formation.

EXAMPLE VI

Multicolor styrenated alkyd-ethyl cellulose-styrene butadiene coating composition Composition A—Yellow styrenated alkyd dispersing vehicle:

| | Parts by weight |
|---|---|
| Styrenated alkyd resin, 45% solids in toluol (Styresol 4240—Reichhold) | 48.8 |
| Tinting paste, medium chrome yellow in linseed oil, 70% pigment | 2.4 |
| Aromatic petroleum solvent (kauri butanol value, 72; distillation range 321–398° F.) | 48.8 |
| Total | 100.0 |

Composition B—Red ethyl cellulose vehicle:

| | Parts by weight |
|---|---|
| Ethyl cellulose (49.0+% ethoxyl, 100 cps. viscosity) | 7.9 |
| Red iron oxide | 1.6 |
| Aromatic petroleum solvent (kauri butanol value, 72; distillation range 321–398° F.) | 70.8 |
| Butyl alcohol | 19.7 |
| Total | 100.0 |

Composition C—Black styrene butadiene vehicle:

| | Parts by weight |
|---|---|
| Styrene butadiene resin (low viscosity) Pliolite S–5A | 26.3 |
| Lamp black | 2.8 |
| Chlorinated biphenyl (Aroclor 1254) | 2.9 |
| Aromatic petroleum solvent (kauri butanol value, 72; distillation range 321–398° F.) | 68.0 |
| Total | 100.0 |

Composition D—Multicolor yellow-red-black styrenated alkyd-ethyl cellulose-styrene butadiene coating:

| | Parts by weight |
|---|---|
| Composition A | 75 |
| Composition B | 12.5 |
| Composition C | 12.5 |
| Total | 100.0 |

Compositions B and C were added to composition A in the order listed, with stirring after each addition to disperse the added material, thereby providing composition D.

Composition D was brushed and sprayed onto tinned steel panels, yielding multi-colored films which were striated when brushed, and more regular in pattern when applied by spraying.

In this example, three immiscible vehicles are used instead of two. This permits the extension of the non-stable type of dispersion to a three-color coating composition.

The presence of polymers in three phases rather than two, increases the difficulty of providing a common solvent for all phases. A small solvent differential was necessary here to improve the solubility of the ethyl cellulose.

EXAMPLE VII

Multicolor vinyl toluene/butadiene-acrylic coating composition

Composition A—Red vinyl toluene/butadiene vehicle:

| | Parts by weight |
|---|---|
| Vinyl toluene/butadiene resin (Marbon 1100 T MV) | 22 |
| Red iron oxide | 10 |
| Aromatic petroleum solvent (kauri butanol value, 72; distillation range, 320–402° F.) | 68 |
| Total | 100.0 |

Composition B—White acrylic vehicle:

| | Parts by weight |
|---|---|
| Acrylic resin, 40% solids in aromatic petroleum solvent [1] (Rohm & Haas F–10) | 65.8 |
| Titanium dioxide | 17.5 |
| Aromatic petroleum solvent (kauri butanol value, 72; distillation range, 320–402° F.) | 16.7 |
| Total | 100.0 |

[1] Resin supplied in aromatic petroleum solvent of kauri butanol value, 70; distillation range, 350–410° F.

Composition C—Multicolor red-white vinyl toluene/butadiene-acrylic coating.—Thirty-three parts of composition B was added to sixty-seven parts of Composition A, and the mixture stirred with moderate agitation until a dispersion of uniform appearance was obtained. Composition C was applied to a non-porous surface by spraying, brushing, and roller coating to yield clearly visible multicolor patterns. The pattern varied with the method of application. Spraying produced a non-directional, fine grain, pointillistic effect, brushing yielded a striated pattern, and roller coating gave a mottled appearance where the spacing of pattern elements resembled the geometry of the surface used as the applicator.

In this example an aromatic petroleum solvent was satisfactory for use with the film former of each phase. The grade used as thinner closely approximated that of the solvent in which the acrylic resin was supplied.

EXAMPLE VIII

Multicolor styrene/butadiene-alkyd coating composition

Composition A—Black styrene/butadiene vehicle:

| | Parts by weight |
|---|---|
| Styrene/butadiene resin (Goodyear Pliolite S–5A) | 19.9 |
| Color chips, 40% lamp black in styrene/butadiene resin | 14.2 |
| Toluene | 23.0 |
| Mineral spirits | 33.0 |
| Aromatic petroleum solvent (kauri butanol value, 90; distillation range, 362–412° F.) | 9.9 |
| Total | 100.0 |

Composition B—Clear alkyd vehicle:

| | Parts by weight |
|---|---|
| Long oil alkyd (65% soya oil, 24% phthalic anhydride, 70% solids in mineral spirits; Reichhold 10–045) | 71.1 |
| Toluene | 14.2 |
| Mineral spirits | 14.2 |
| Cobalt naphthenate drier in mineral solvent; 6% cobalt | 0.36 |
| Lead naphthenate drier in mineral solvent; 24% lead | 0.14 |
| Total | 100.0 |

Composition C—Black styrene/butadiene vehicle dispersed in clear alkyd.—Equal parts of compositions A and B were intermixed and stirred with moderate agitation. This yielded a dispersion in which composition A took the form of viscous streamer-like material suspended in composition B. In the absence of agitation the dispersed material slowly settled out and coalesced, but could be re-dispersed readily by stirring.

Upon spraying through an ordinary lacquer gun, composition C formed a pattern resembling a network through which the substrate was visible. The effect was controllable, but a variety of patterns was obtainable by means of adjustments in spray pressures, rate of flow of the dispersion, and distance of spray gun from the surface of the substrate.

EXAMPLE IX

Multicolor styrene/butadiene—alkyd coating composition

Composition A—Black styrene/butadiene vehicle:

| | Parts by weight |
|---|---|
| Styrene/butadiene resin, high viscosity (Marbon HV) | 18.5 |
| Color chips, 40% lamp black in styrene/butadiene resin | 13.2 |
| Toluene | 21.6 |
| Mineral spirits | 37.5 |
| Aromatic petroleum solvent (kauri butanol value, 90; distillation range, 362–412° F.) | 9.2 |
| Total | 100.0 |

Composition B—White alkyd vehicle:

| | Parts by weight |
|---|---|
| Long oil alkyd (65% soya oil, 24% phthalic anhydride, 70% solids in mineral spirits; Reichhold 10–045) | 51.7 |
| Titanium dioxide | 27.1 |
| Aromatic petroleum solvent (kauri butanol value, value, 92; distillation range, 280–340° F.) | 20.7 |
| Cobalt naphthenate drier in mineral solvent; 6% cobalt | 0.36 |
| Lead naphthenate drier in mineral solvent; 24% lead | 0.14 |
| Total | 100.0 |

Composition C—Multicolor black-white styrene/butadiene-alkyd coating.—Equal parts of compositions A and B were intermixed and stirred with moderate agitation until a dispersion of uniform appearance was obtained. On spraying through an ordinary lacquer gun, composition C produced a multicolor coating in which black and white areas were readily distinguishable from one another, either with or without complete coverage of the substrate.

In this composition, veiling produced a wet film of non-uniform thickness. Phase separation occurred more extensively at thicker portions of the film, providing areas of various irregular shapes which were distinctly different in color from regions where less phase separation occurred. Discrete areas up to one-quarter inch or larger were readily obtained. These regions of different color could be modified in size and relative proportion, not only by changes in composition but also by the spraying process, such as variations in air pressures, thickness of applied coating, etc.

Composition C could be used to build thick films without sagging, and exhibited good holdout without substantial penetration when applied on porous surfaces. When a relatively thick film was to be applied, better pattern formation was obtained by applying a tack coat first, followed by a pattern coat of moderate thickness.

In the present invention as exemplified in the examples described herein, the mode of applying the transient dispersion, as well as the relative viscosities of the phases thereof, determines to a substantial extent the decorative pattern that will be obtained when the dispersion is applied to a substrate.

When the two phases of the present invention are relatively thin, the films formed on application are relatively smooth or of very slight texture. The visible color contrast of the deposited film is in the form of pointillism of fine grain. The visible color elements are due to coalescence of finely dispersed particles of each phase. The range of viscosity is that which can be sprayed, brushed, or roller coated.

When the viscosity of one of the phases is increased to a heavy bodied one of 1,000–10,000 centipoises or over, on mixing such a phase with a relatively thin one, the heavy bodied phase becomes the dispersed phase and the thin bodied one a dispersing medium or carrier vehicle. As the viscosity of dispersed phase increases, the dispersed particles increase in size with the same degree of agitation, and the color visibility of the applied film is less dependent on coalescence of particles as in the case when both phases are relatively thin.

I claim:

1. A coating composition for use in selectively defining any one of a plurality of decorative patterns of a desired design on a surface with said pattern being determined at least in part by the mode of application of said composition to said surface, which composition prior to agitation and application to a surface consists essentially of at least first and second fluid components that are visibly distinct to the naked eye, and that by said agitation are transformed to minute globules that tend to coalesce to agglomerates of greater than 25 microns in size that are visible to the naked eye when said composition is applied to said surface, said composition comprising:
   (a) first and second organic solvents that are miscible; and
   (b) first and second incompatible organic film formers dissolved in said first and second organic solvents in sufficient quantities as to render the latter immiscible and provide said first and second fluid components, with each film former being dissolved separately in one or both of the solvents, followed by mixing the two thus formed solutions, with said decorative pattern being selectively determined at least in part by the mode of application to said surface in which said globules are brought into coalescing contact with one another.

2. A coating composition as defined in claim 1 wherein the fluid characteristics of said second fluid component permit further formation of said agglomerates by said globules which migrate therethrough after said coating composition is applied to said surface, with said migration at least in part being effected by currents formed in said coating composition after application to said surface as said first and second solvents evaporate from said coating composition.

3. A coating composition as defined in claim 1 wherein said first fluid component includes a colorant not soluble in said second fluid component that colors said first fluid component to a color different from that of said second fluid component.

4. A coating composition as defined in claim 1 wherein said first fluid component includes a colorant that is not soluble in said second fluid component, and said second fluid component is transparent and colorless.

5. A coating composition as defined in claim 1 wherein said first and second fluid components have first and second colorants of contrasting appearance incorporated therein that do not migrate appreciably between said first and second fluid components.

6. A coating composition as defined in claim 1 wherein said first solvent and first organic film former are so selected that said first fluid component has such physical characteristics that when said composition is sprayed onto a surface, said first fluid composition assumes a pattern that is defined by a plurality of said agglomerates which are sufficiently large as to be readily visible to the naked eye, which agglomerates are connected by a plurality of fine threads of said globules visible to the naked eye that extend between said agglomerates in a random pattern.

7. A coating composition as defined in claim 1 wherein said first solvent and first film former are so selected that said first fluid component has such physical characteristics that when said composition is brushed onto a surface said first fluid composition assumes a pattern that is defined by a plurality of elongate agglomerates of which at least a portion thereof are laterally spaced and resemble the grain pattern of wood.

8. A coating composition as defined in claim 1 wherein said first and second fluid components have such physical characteristics that when said composition is sprayed onto a surface, said globules of said first fluid composition bond to assume a pattern that is defined by a plurality of said agglomerates in spaced relationship, which agglomerates are individually of such size as to be barely visible to the naked eye.

9. A decorative finish-producing composition in the form of a dispersion including a first flowable fluid component comprising a first organic film former dissolved in a first organic solvent and a second flowable fluid component that is substantially immiscible with said first fluid component with said second fluid component comprising a second organic film former dissolved in a second organic solvent, which composition is characterized by:
   (a) said first and second solvents which are selected from a plurality of pairs of miscible solvents and cause no precipitation of said film formers when said first and second fluid components are in contact with one another;
   (b) said first and second film formers which are selected from a plurality of pairs of incompatible film formers that are dissolved in said first and second solvents in sufficient quantities that said first and second fluid components are substantially immiscible with one another; and
   (c) a first colorant in said first fluid component that is not soluble in said second fluid component, and visually distinguishes said first fluid component from said second fluid component to the naked eye, with each film former being dissolved separately in one or both of the solvents, followed by mixing the two thus formed solutions.

10. A decorative finish-producing composition as defined in claim 9 wherein at least one of said first or second fluid components is colored.

11. A decorative finish producing composition as defined in claim 9 which in addition includes:
   (d) a second colorant in said second fluid component that is visibly distinct to the naked eye from said first colorant, with said second colorant not soluble in said first fluid component.

12. A decorative finish producing composition as defined in claim 9 in which said first fluid component when said finish producing composition is in the form of minute globules of less than 25 microns in diameter that tend to coalesce into agglomerates of greater than 25 microns in size that are visible to the naked eye and define said decorative pattern when said decorative finish producing composition is applied as a film to a surface.

13. A decorative finish producing composition as defined in claim 9 wherein said first and second organic solvents contain the same ingredients.

14. A decorative finish producing composition as defined in claim 9 wherein said first and second organic solvents are volatile at room temperature.

15. A decorative finish producing composition as defined in claim 12 in which said second fluid composition is sufficiently fluid as to permit said globules to continue to form said agglomerates after said film is applied to said surface.

16. A decorative finish producing composition as defined in claim 12 in which said second fluid composition is sufficiently fluid and said second solvent takes a sufficiently long time to evaporate that a substantial quantity of said globules are formed from said globules after said decorative finish producing composition has been applied as said film.

17. A decorative finish producing composition as defined in claim 12 in which said first fluid composition is buoyant relative to said second fluid composition, and said agglomerates rising to the exterior surface of said film.

18. A decorative finish producing composition as defined in claim 17 which in addition includes:
   (d) a second colorant in said second fluid component that is visibly distinct to the naked eye from said first colorant, said second colorant not soluble in said first fluid component, and said agglomerates being viewable in said film against a colored background of said second fluid component.

19. The method of selectively forming a decorative finish of any one of a plurality of desired patterns on a surface by a liquid coating composition including forming at least first and second fluid components, which first and second fluid components comprise first and second miscible organic solvents and first and second incompatible organic film formers dissolved in sufficient quantities in said first and second organic solvents as to render them immiscible, with each film former being dissolved separately in one or both of the solvents, followed by mixing the two thus formed solutions, with said first fluid component having an appearance that visually distinguishes said first fluid component from said second fluid component to the naked eye, which first and second organic solvents are so selected that there is no precipitation of a film forming material from said first or second fluid components when said first and second fluid components are mixed, and said first organic solvent and first film former so chosen that upon agitation of said coating composition said first fluid component is dispersed into said second fluid component in the form of minute globules, that tend to coalesce to agglomerates of greater than 25 microns in size, and with said method comprising agitating said first and second fluid components to disperse said first fluid component into said second fluid component as said globules, with the dispersion so formed being applied to said surface, and the mode of application of said dispersion determining substantially the configuration of the decorative pattern that will be formed thereon as said globules are brought into coalescing contact with one another.

20. The method as defined in claim 19 wherein said first and second solvents contain the same ingredients.

21. The method as defined in claim 19 wherein said first fluid component includes a plurality of film formers, which plurality of film formers in combination are incompatible relative to said second film former.

22. The method as defined in claim 19 wherein both said first and second components are colored to first and second visually distinguishable colors.

23. The method as defined in claim 19 wherein the viscosities of said first and second components are so adjusted relative to one another that said decorative finish is striated in appearance when said composition is brushed onto said surface.

24. The method as defined in claim 22 wherein the viscosities of said first and second components are so adjusted relative to one another that said decorative finish is striated in appearance and partially masks the original appearance of said surface when said composition is brushed onto said surface.

25. The method as defined in claim 22 wherein the viscosities of said first and second colored components are so adjusted relative to one another that said decorative finish is striated in appearance and completely masks the original appearance of said surface when said composition is brushed onto said surface.

26. The method as defined in claim 19 wherein the viscosities of said first and second components are so adjusted relative to one another that said decorative finish is partially defined by spaced, discrete areas of said first fluid component that are connected by a plurality of fine threads of said first fluid component when said composition is sprayed onto said surface.

27. The method as defined in claim 19 wherein the viscosities of said first and second components are so adjusted relative to one another that said decorative finish resembles the art form of pointillism when said composition is sprayed onto said surface.

28. The decorative finish formed by the method defined in claim 19 on a surface.

29. A decorative finish-producing composition as defined in claim 1 wherein the viscosities of said first and second phases are so related that when said composition is sprayed on said surface after agitation, said finish resembles the art form of pointillism, and when said composition is brushed on said surface after agitation, said finish presents a striated appearance.

30. The method of preparing a decorative finish-producing composition that can be used after agitation to selectively impart any one of a plurality of selected patterns to a surface, including the steps of:
   (a) dissolving a first organic film former in a first organic solvent until a first fluid component is obtained that is flowable and of a desired viscosity;
   (b) dissolving a second organic film former in a second organic solvent until a second fluid component is obtained that is of a different appearance than said first fluid component, is flowable, and of a desired viscosity, which first and second solvents are selected from a group of solvents that are miscible with one another, and cause no precipitation of said first and second film formers when said first and second fluid components are in contact with one another, with said first and second film formers being selected from a plurality of pairs of film formers that are sufficiently incompatible that said first and second fluid components are immiscible and remain as separate strata until said decorative finish-producing composition is agitated, whereupon said first and second fluid components are dispersed one into the other in subdivided form, with said first and second fluid components when concurrently applied to said surface in said subdivided form defining a pattern of discrete areas of said first and second phases that are visible to the naked eye which coalesce with one another to define a continuous film that adheres to said surface, and as said first and second solvents evaporate from said film, said film is transformed to define said decorative finish; and
   (c) mixing said first and second fluid components together to obtain said composition in which said first and second fluid components remain as separate strata until said composition is agitated.

31. The method as defined in claim 30 which includes the additional step of coloring at least one of said fluid components before said first and second fluid components are mixed together.

32. The method as defined in claim 30 which includes the additional steps of coloring said first and second fluid components to different colors prior to mixing said first and second fluid components together.

33. The method as defined in claim 31 in which the color of said fluid component that is pigmented is altered after said first and second fluid components are mixed together which includes the further step of adding another portion of said fluid component that has been colored to said first and second fluid components after mixing thereof, but with said additional portion being pigmented to a shade of said color different from the color of said initially colored fluid component.

References Cited

UNITED STATES PATENTS 2,990,386  6/1961  Roney _____ 106—170

OTHER REFERENCES

Hackh Chemical Dictionary (3rd ed.) (McGraw-Hill) (N.Y.) (1944), p. 557.

MORRIS LIEBMAN, Primary Examiner

H. H. FLETCHER, Assistant Examiner

U.S. Cl. X.R.

106—170, 193, 198, 228; 260—13, 17, 18, 30.6, 31.4, 32.8, 33.6, 33.8, 34.2, 823